United States Patent
Gouda et al.

(10) Patent No.: US 7,954,142 B2
(45) Date of Patent: May 31, 2011

(54) SYSTEM AND METHOD OF RESOLVING DISCREPANCIES BETWEEN DIVERSE FIREWALL DESIGNS

(75) Inventors: Mohamed G. Gouda, Austin, TX (US); Xiang-Yang Alex Liu, Austin, TX (US)

(73) Assignee: The Board of Regents, University of Texas System, Austin, TX (US)

( * ) Notice: Subject to any disclaimer, the term of this patent is extended or adjusted under 35 U.S.C. 154(b) by 1311 days.

(21) Appl. No.: 11/444,017

(22) Filed: May 31, 2006

(65) Prior Publication Data
US 2006/0294577 A1 Dec. 28, 2006

Related U.S. Application Data

(60) Provisional application No. 60/690,594, filed on Jun. 15, 2005.

(51) Int. Cl.
*G06F 9/00* (2006.01)
*G06F 15/16* (2006.01)
*G06F 17/00* (2006.01)

(52) U.S. Cl. ............... 726/11; 726/1; 726/22; 709/224; 713/155

(58) Field of Classification Search ............... 726/1
See application file for complete search history.

(56) References Cited

U.S. PATENT DOCUMENTS
2006/0195896 A1* 8/2006 Fulp et al. ............... 726/11

OTHER PUBLICATIONS

Gouda et al. "Firewall Design, Consistency, Completeness, and Compactness" ICDCS, Mar. 2004, pp. 1-8.*

* cited by examiner

*Primary Examiner* — Michael Pyzocha
*Assistant Examiner* — Shewaye Gelagay
(74) *Attorney, Agent, or Firm* — Antony P. Ng; Dillon & Yudell LLP (57) ABSTRACT

A system, computer-implementable method, and computer-usable medium for resolving discrepancies between diverse firewall designs. In a preferred embodiment of the present invention, a firewall design manager receives at least two designs for a rule-based system and computing at least one functional discrepancy between the at least two designs utilizing decision diagrams.

18 Claims, 8 Drawing Sheets

1. $(I \in \{0\}) \wedge (S \in all) \wedge (D \in \{\gamma\}) \wedge (N \in \{25\}) \wedge (P \in \{0\}) \rightarrow a$
2. $(I \in \{0\}) \wedge (S \in [\alpha,\beta]) \wedge (D \in all) \wedge (N \in all) \wedge (P \in all) \rightarrow d$
3. $(I \in all) \wedge (S \in all) \wedge (D \in all) \wedge (N \in all) \wedge (P \in all) \rightarrow a$

SYSTEM AND METHOD OF RESOLVING DISCREPANCIES BETWEEN DIVERSE FIREWALL DESIGNS

PRIORITY CLAIM

The application claims the benefit of priority under 35 U.S.C. §119(e) from U.S. Provisional Application No. 60/690,594, filed on Jun. 15, 2005, which disclosure is incorporated herein by reference.

BACKGROUND OF THE INVENTION

1. Technical Field

The present invention relates to the field of data processing systems. More particularly, the present invention relates to the field of securing data processing systems. Still more particularly, the present invention relates to a system and method of designing firewalls to secure data processing systems

2. Description of the Related Art

A firewall is a hardware and/or software network element interposed between a private network and an external network (e.g., Internet) to enforce a desired security policy on all incoming and outgoing packets. A packet can be viewed as a tuple with a finite number of fields; examples of these fields are source/destination IP address, source/destination port number, and protocol type. A firewall configuration defines which packets are legitimate and which are illegitimate. By examining the values of these fields for each incoming and outgoing packet, a firewall differentiates between legitimate and illegitimate packets, accepting legitimate packets and discarding illegitimate packets according to its configuration.

An error in a firewall configuration means that a wrong definition of legitimate or illegitimate has been established for at least some packets, which will either allow unauthorized access from the outside Internet to the private network or disable some legitimate communication between the private network and the outside Internet. Neither error case is desirable. Design of a firewall configuration is therefore and important network security and operability issue.

SUMMARY OF THE INVENTION

The present invention includes a system, computer-implementable method, and computer-usable medium for resolving discrepancies between diverse firewall designs. In a preferred embodiment of the present invention, a firewall design manager receives at least two designs for a rule-based system and computing at least one functional discrepancy between the at least two designs utilizing decision diagrams.

The above-mentioned features, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1A:
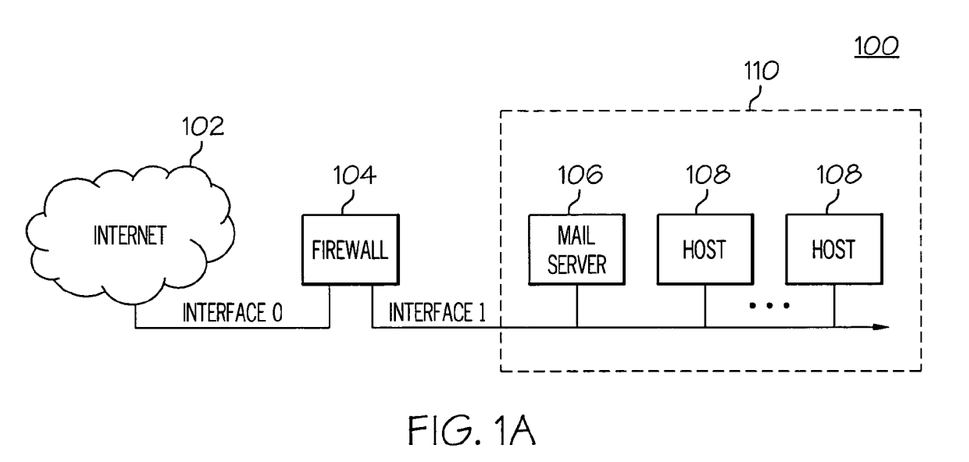
FIG. 1A illustrates an exemplary firewall in which a preferred embodiment of the present invention may be implemented.

With reference now to the figures, and in particular, with reference to FIG. 1A, there is depicted a block diagram illustrating an exemplary network 100 in which a preferred embodiment of the present invention may be implemented. As illustrated, network 100 includes Internet 102, which is coupled to private network 110 via firewall 104. Internet 102 is an interconnected system of networks that connects computers around the world via the transmission control protocol/internet protocol (TCP/IP) protocol suite. Firewall 104 provides secure access to and from private network 110. Particularly, any packet that attempts to enter or leave private network 110 is first examined by firewall 104 and, depending on the settings of the different fields in the packet, firewall 104 determines whether to transmit or discard the packet.

In the depicted embodiment, private network 110 includes a mail server 106 and at least one host 108. If firewall 104 decides to accept an incoming packet, the packet is routed by firewall 104 or an associated router to either mail server 106 or host(s) 108 depending on the setting of the fields in the packet.

Figure 1B:
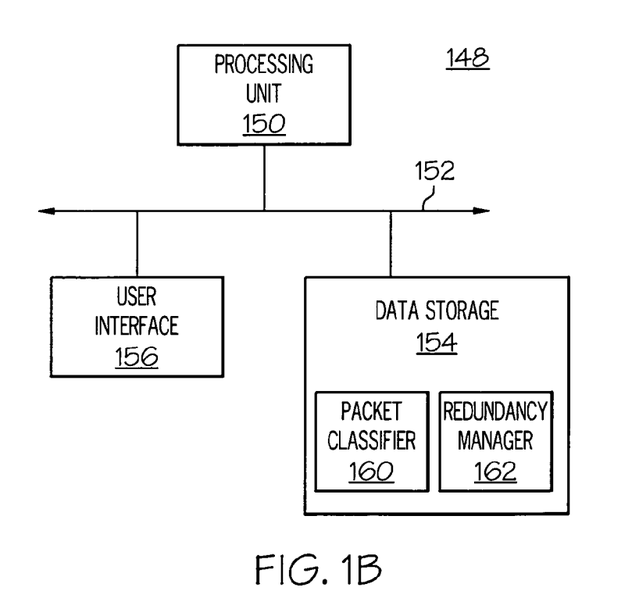
FIG. 1B is a block diagram depicting an exemplary data processing system in which a preferred embodiment of the present invention may be implemented.

FIG. 1B is a block diagram depicting an exemplary data processing system 148 in which a preferred embodiment of the present invention may be implemented. Those with skill in the art will appreciate that firewall 104, mail server 106, or host(s) 108 may be implemented with a data processing system 148. Also, those with skill in the art will appreciate that the present invention is not limited to the representation of data processing system 148 illustrated in FIG. 1B, but may include any type of single or multi-processor data processing system.

As illustrated, data processing system 148 includes processing unit 150, data storage 154, and user interface 156 which are all coupled by interconnect 152. Data storage 154 may be implemented by any type of volatile or non-volatile memory such as read-only memory (ROM), random-access memory (RAM), any type of flash memory, optical memory, and magnetic storage. Also, as depicted, data storage 154 includes firewall design manager 160, which provides to a user a graphical user interface for developing firewalls, discussed herein in more detail.

A firewall is usually defined by a sequence of rules, which may overlap and conflict with each other. Two rules overlap if and only if there is at least one packet that matches both rules. Two rules conflict if and only if the two rules overlap and also have different decisions. The conflicts among rules make firewall design difficult and error prone. Examining each conflict is helpful in reducing errors; however, the number of conflicts in a firewall is usually large, and the manual checking of each conflict or anomaly is unreliable because the meaning of each rule depends on the current order of the rules in the firewall, which may be incorrect. High-level languages for describing firewall rules are helpful in firewall design; however, high-level languages do not address conflicts.

Some firewall rule analysis tools exist for designers to analyze the effects of existing firewall rules. The analysis provided by such tools answers queries from users. These tools are helpful in analyzing some suspicious behaviors of a firewall; however, ad-hoc user queries are not guaranteed to cover all possible situations that the firewall may encounter during operation.

Other tools are currently available for network vulnerability testing. These vulnerability testing tools scan a private network based on the current publicly known attacks, rather than the requirement specification of a firewall. Although vulnerability testing tools can possibly catch errors that allow illegitimate access to the private network, they cannot find the errors that disable legitimate communication between the private network and the outside Internet.

Firewall Design Methods

A "packet" is defined over the fields $F_1 \ldots, F_d$ as a d-tuple $(p_1 \ldots, P_d)$ where each $p_i$ is an element in the domain $D(F_i)$ of field $F_i$, and each $D(F_i)$ is an interval of nonnegative integers. For example, one of the fields of an IP packet is the source address, and the domain of this field is $[0,2^{32})$. For the brevity of presentation, we assume that all packets are over the d fields $F_1 \ldots, F_d$, and we use $\Sigma$ to denote the set of all packets. It follows that $\Sigma$ is a finite set of size $|D(F_1)|x \ldots x|D(F_n)|$.

Firewall

A "firewall" consists of a sequence of rules, where each rule is of the following format:

$$(F_1 \in S_1) \wedge \ldots \wedge (F_d \in S_d) \to <\text{decision}>$$

where each $S_i$ is a nonempty subset of $D(F_i)$, and the <decision> is either accept or discard. If $S_i = D(F_i)$, we can replace $(F_i \in S_i)$ by $(F_i \in \text{all})$, or remove the conjunct $(F_i \in D(F_i))$ altogether. A packet $(p_1 \ldots, p_d)$ matches a rule $(F_1 \in S_1) \wedge \ldots \wedge (F_d \in S_d) \to <\text{decision}>$ if and only if the condition $(p_1 \in S_1) \wedge \ldots \wedge (p_d \in S_d)$ holds. Since a packet may match more than one rule in a firewall, each packet is mapped to the decision of the first rule that the packet matches. The predicate of the last rule in a firewall is usually a tautology to ensure that every packet has at least one matching rule in the firewall.

Firewall Function

A "firewall function" is a many-to-one mapping: $\Sigma \to \{\text{accept, discard}\}$. This function can be defined by a sequence of rules or by a firewall decision diagram. Two firewalls are equivalent if and only if they implement the same firewall function.

Firewall Decision Diagram

A "Firewall Decision Diagram" (FDD) f over fields $F_1 \ldots, F_d$, is an acyclic and directed graph that has the following five properties:

1. There is exactly one node in f that has no incoming edges. This node is called the root of f. The nodes in f that have no outgoing edges are called terminal nodes of f.
2. Each node v in f has a label, denoted F(v), such that $F(v) \in \{F_1, \ldots, F_d\}$ if v is a nonterminal node; and $F(v) \in \{\text{accept, discard}\}$ if v is a terminal node.
3. Each edge e in f has a label, denoted I(e), such that if e is an outgoing edge of node v, then
   $I(e) \subseteq D(F(v))$.
4. A directed path in f from the root to a terminal node is called a decision path of f. No two nodes on a decision path have the same label.
5. The set of all outgoing edges of a node v in f, denoted E(v), satisfies the following two conditions:
   (a) Consistency: $I(e) \cap I(e') = \emptyset$ for any two distinct edges e and e' in E(v),
   (b) Completeness: $\cup_{e \in E(v)} I(e) = D(F(v))$ A decision path in an FDD f is represented by $(v_1 e_1 \ldots v_k e_k v_{k+1})$ where $v_1$ is the root, $v_{k+1}$ is a terminal node, and each $e_i$ is a directed edge from node $v_i$ to node $v_{i+1}$. A decision path $(v_1 e_1 \ldots v_k e_k v_{k+1})$ in an FDD defines the following rule:

$$F_1 \in S_1 \wedge \ldots \wedge F_n \in S_n \to F(v_{k+1})$$

where $S_i = I(e_j)$ if there is a node $v_j$ in the decision path that is labeled with field $F_i$;
and $S_i = D(F_i)$ if no nodes in the decision path is labeled with $F_i$.

For an FDD f, $S_f$ denotes the set of all the rules defined by all the decision paths of f. For any packet p, there is one and only one rule in $S_f$ that p matches because of the consistency and completeness properties; therefore, f maps p to the decision of the only rule that p matches.

Given an FDD f, any sequence of rules that consists of all the rules in $S_f$ is equivalent to f. The order of the rules in such a firewall is immaterial because the rules in $S_f$ are non-overlapping.

The construction of an equivalent FDD for a given sequence of rules is discussed herein in more detail.

Exemplary Firewalls

Consider again the simple network 100 illustrated in FIG. 1A. Network 100 has a gateway router 104 with two interfaces: interface 0, which connects gateway router 104 to the outside Internet, and interface 1, which connects gateway router 104 to private network 110. The firewall for this local network resides in gateway router 104. An exemplary requirement specification for this firewall may be expressed as follows:

The mail server with IP address 192.1.2.3 can receive emails. The packets from an outside malicious domain 192.168.0.0/16 should be blocked. Other packets should be accepted and allowed to proceed.

Suppose this requirement specification is given to two design teams: Team A and Team B. Team A designs a firewall 200 expressed as FDD 200 depicted in FIG. 2, and Team B designs a firewall 300 expressed as a sequence of rules illustrated in FIG. 3. In these figures, the following symbols are utilized by: a (Accept), d (Discard), I (Interface), S (Source IP), D (Destination IP), N (Destination Port), P (Protocol Type). The symbols α, β, γ respectively denote the integer formed by the four bytes of the IP addresses 192.168.0.0, 192.168.255.255, and 192.1.2.3. For simplicity, the protocol type value in a packet is either 0 (TCP) or 1 (UDP), and each packet has a field containing the information of the network interface on which that packet arrived.

Figure 2:
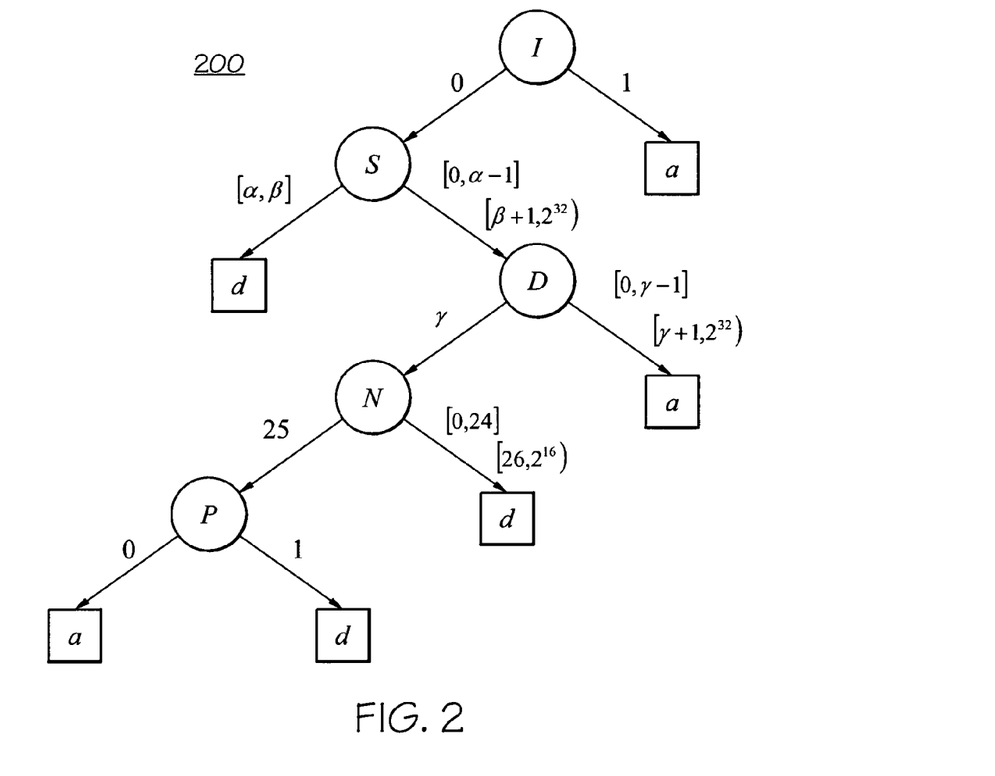
FIG. 2 illustrates an exemplary firewall in the form of a firewall decision diagram according to a preferred embodiment of the present invention.
Figure 3:
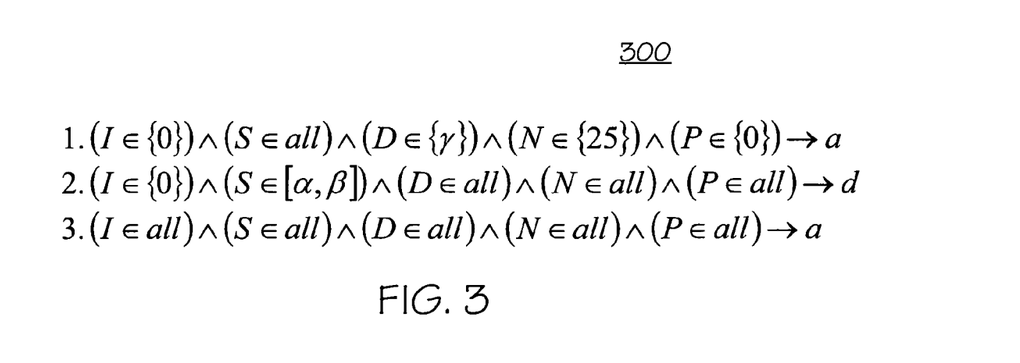
FIG. 3 depicts a second exemplary firewall in the form of a collection of firewall rules according to a preferred embodiment of the present invention.
Figure 8:
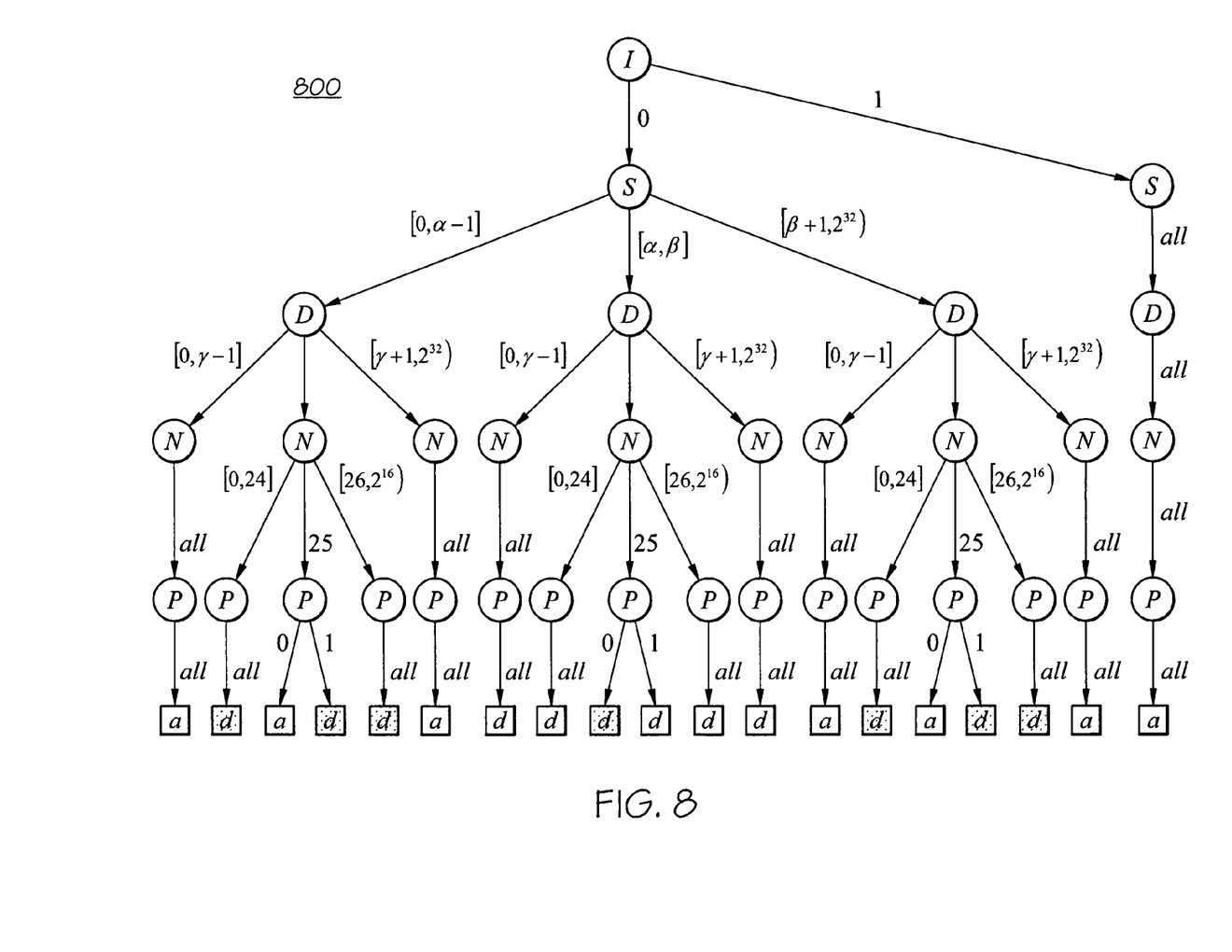
FIG. 8 illustrates a firewall decision diagram transformed from the firewall decision diagram depicted in FIG. 2, according to a preferred embodiment of the present invention.

Given these two firewalls, one in FIG. 2 and the other in FIG. 3, the following three steps are utilized to discover all the discrepancies between them: (1) construct an equivalent ordered FDD 500 (in FIG. 5) from the sequence of rules in FIG. 3 by the construction algorithm; (2) transform the two ordered FDDs, one in FIG. 2 and the other in FIG. 5, to two semi-isomorphic FDDs (e.g., semi-isomorphic FDD 800 as illustrated in FIG. 8) by the shaping algorithm, discussed hereinafter in more detail; and (3) discover all the discrepancies between the two semi-isomorphic FDDs by the comparison algorithm, also discussed hereinafter in more detail.

Construction Algorithm

The construction algorithm constructs an equivalent FDD from a sequence of rules $<r_1, \ldots, r_n>$ where each rule is of the format $(F_1 \in S_1) \wedge \ldots \wedge (F_d \in S_d) \rightarrow <\text{decision}>$. Note that all the d packet fields appear in the predicate of each rule, and they appear in the same order.

First, a partial FDD is constructed from the first rule. A "partial FDD" is a diagram that has all the properties of an FDD, except the completeness property. The partial FDD constructed from a single rule contains only the decision path that defines the rule. Suppose from the first i rules, $r_1$ through $r_i$, a partial FDD is constructed, whose root v is labeled $F_1$, and suppose v has k outgoing edges $e_i, \ldots, e_k$. Let $r_{i+1}$ be the rule $(F_1 \in S_1) \wedge \ldots \wedge (F_d \in S_d) \rightarrow <\text{decision}>$. Next, rule $r_{i+1}$ is appended to this partial FDD.

To add rule $r_{i+1}$, a determination is made whether another outgoing edge is to be added to v. If $S_1 - (I(e_i) \cup \ldots \cup I(e_k)) \neq \emptyset$, a new outgoing edge with label $S_1 - (I(e_i) \cup \ldots \cup I(e_k))$ is added to v because any packet whose $F_1$ field is an element of $S_1 - (I(e_i) \cup \ldots \cup I(e_k))$ does not match any of the first i rules, but matches $r_{i+1}$ provided that the packet satisfies $(F_2 \in S_2) \wedge \ldots \wedge (F_d \in S_d)$. Then, a decision path from $(F_2 \in S_2) \wedge \ldots \wedge (F_d \in S_d)) \rightarrow <\text{decision}>$ is constructed, and the new edge from node v to the first node of this decision path is also added.

Next, $S_1$ and $I(e_j)$ are compared for each j where $1 \leq j \leq k$. This comparison leads to one of the following three cases:
1. $S_1 \cap I(e_j) = \emptyset$: In this case, edge $e_j$ is skipped because any packet whose value of field $F_1$ is in set $I(e_j)$ doesn't match $r_{i+1}$.
2. $S_1 \cap I(e_j) = I(e_j)$: In this case, for a packet whose value of field $F_1$ is in set $I(e_j)$, it may match one of the first i rules, and it also may match rule $r_{i+1}$. So, the rule $(F_2 \in S_2) \wedge \ldots \wedge (F_d \in S_d)) \rightarrow <\text{decision}>$ is appended to the subgraph rooted at the node to which $e_j$ points.
3. $S_1 \cap I(e_j) \neq \emptyset$ and $S_1 \cap I(e_j) \neq I(e_j)$: In this case, edge e is split into two edges: e' with label $I(e_j) - S_1$ and e" with label $I(e_j) \cap S_1$. Then, two copies of the subgraph rooted at the node that $e_j$ points to are made, and let e' and e" point to one copy each. Further, e' is dealt with by the first case, and e" by the second case.

The foregoing construction algorithm may be expressed in the following pseudocode: In the pseudocode, e.t denotes the (target) node to which the edge e points.

---
Construction Algorithm
---

Input : A firewall f of a sequence of rules $<r_1, \ldots, r_n>$
Output : An FDD f' such that f and f' are equivalent
Steps:
1. build a decision path with root v from rule $r_1$;
2. for i :=2 to n do APPEND(v, $r_i$);
End ---
Construction Algorithm
---

Figure 5:
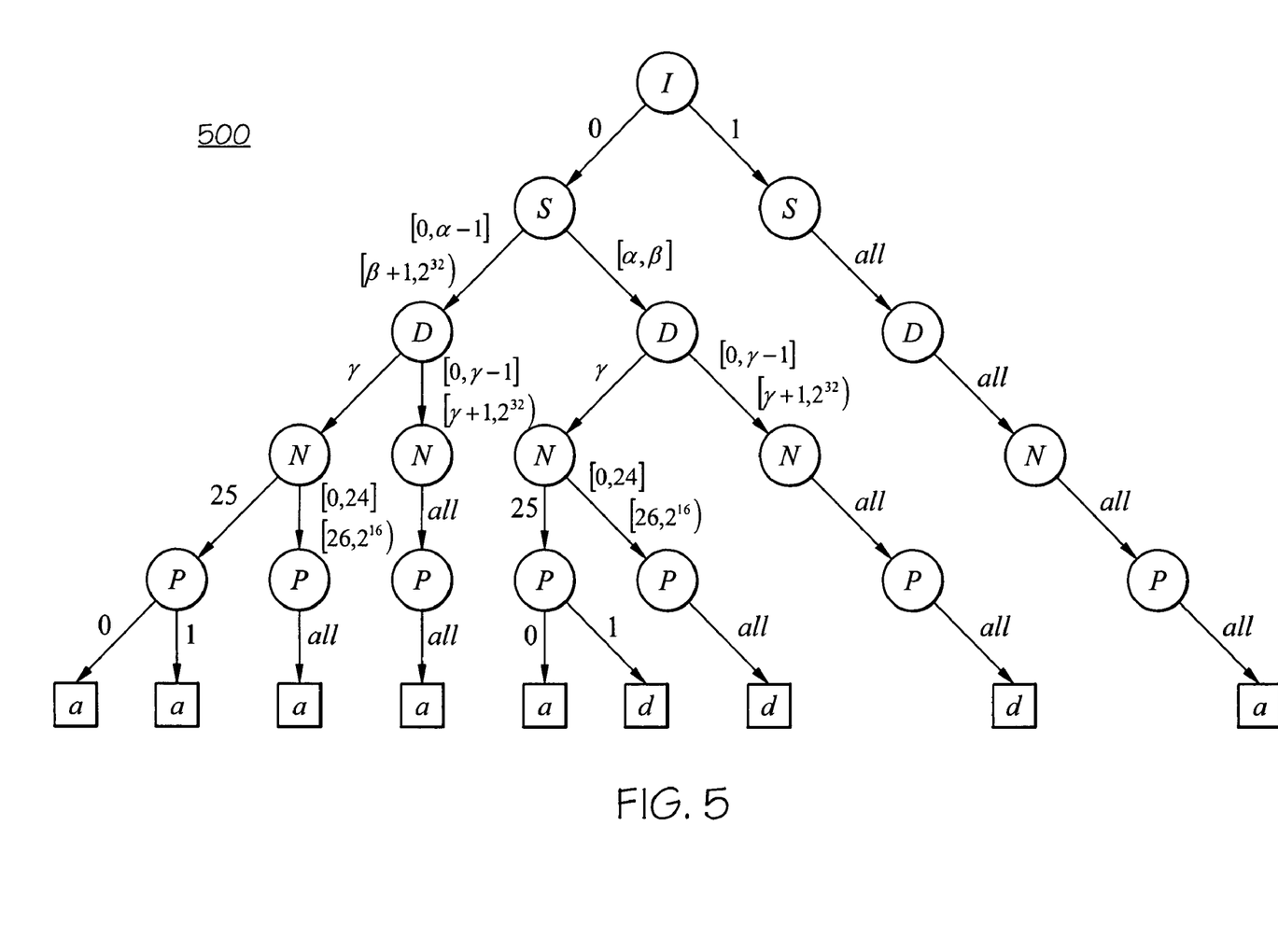
FIG. 5 depicts a firewall decision diagram constructed from the firewall rules illustrated in FIG. 3, according to a preferred embodiment of the present invention.
Figure 6:
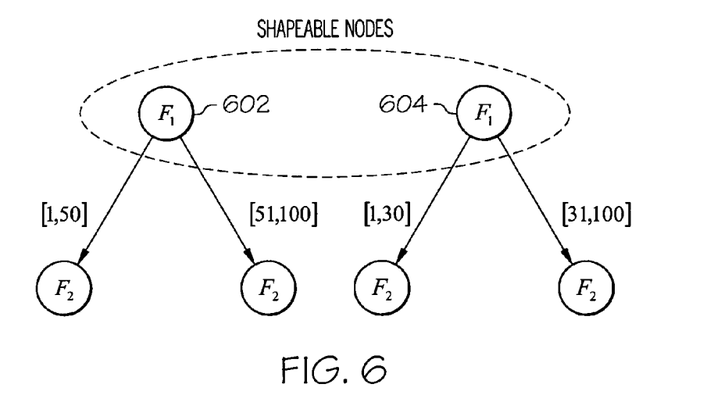
FIG. 6 illustrates a pair of shapeable nodes in two firewall decision diagrams according to a preferred embodiment of the present invention.
Figure 7:
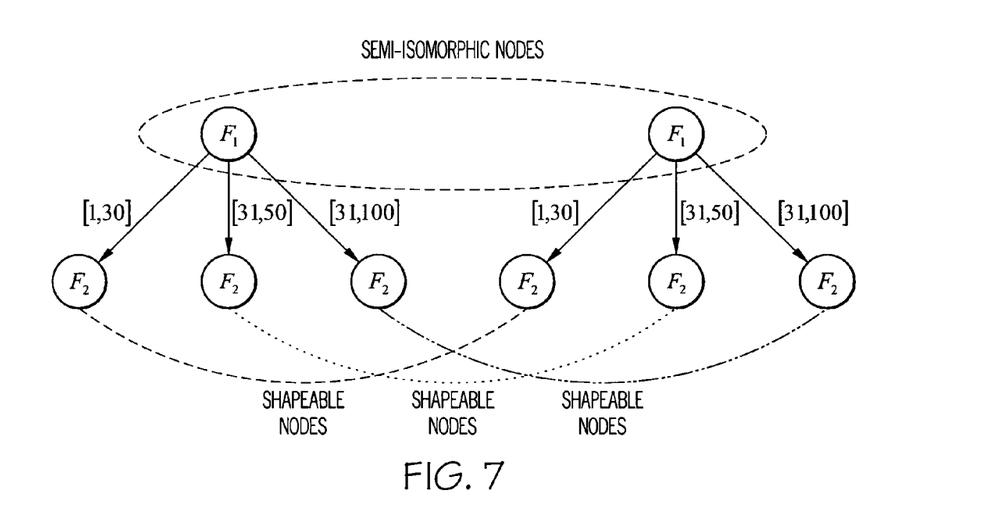
FIG. 7 depicts a pair of semi-isomorphic nodes according to a preferred embodiment of the present invention.

APPEND $(v, F_m \in S_m) \wedge \ldots \wedge (F_d \in S_d) \rightarrow <\text{decision}>$)
/* $F(v) = F_m$ and $E(v) = \{e_1, \ldots e_k\}$ */
1. if ( $S_m - (I(e_1) \cup \ldots \cup I(e_k))) \neq \emptyset$ then
    (a) add an outgoing edge $e_{k+1}$ with label $S_m - (I(e_1) \cup \ldots \cup I(e_k))$ to v;
    (b) build a decision path from rule
    $(F_{m+1} \in S_{m+1}) \wedge \ldots \wedge (F_d \in S_d) \rightarrow <\text{decision}>$,
    and make $e_{k+1}$ point to the first node in this path;
2. if m<d then
    for j :=1 to k do
      if $I(e_j) \wedge S_m$ then
        APPEND($e_j.t, (F_{m+1} \in S_{m+1}) \wedge \ldots \wedge (F_d \in S_d)$
        $\rightarrow <\text{decision}>$);
      else if $I(e_j) \cap S_m \neq \emptyset$ then
        (a) add one outgoing edge e to v, and label e with
        $I(e_j) \cap S_m$;
      (b) make a copy of the subgraph rooted at $e_j.t$, and make e
      points to the root of the copy;
      (c) replace the label of $e_j$ by $I(e_j) - S_m$;
      (d) APPEND( e.t, $(F_{m+1} \in S_{m+1}) \wedge \ldots \wedge (F_d \in S_d)$
      $\rightarrow <\text{decision}>$);

As an example, consider the sequence of rules in FIG. 5. FIG. 6 illustrates the partial FDD that constructed from the first rule, and the partial FDD after appending the second rule. The FDD after appending the third rule is shown in FIG. 7.

Shaping Algorithm

The shaping algorithm is utilized to transform two ordered, but not semi-isomorphic FDDs $f_a$ and $f_b$ into two semi-isomorphic FDDs $f'_a$ and $f'_b$ such that $f_a$ is equivalent to $f'_a$, and $f_b$ is equivalent to $f'_b$. If < denotes the total order over the packet fields $F_1, \ldots, F_d$ where $F_1 < \ldots < F_d$ holds, an FDD is ordered if and only if for each decision path $(v_1 e_1 \ldots v_k e_k v_{k+1})$, the condition $F(v_1) < \ldots < F(v_k)$ holds.

From this definition, the FDDs constructed by the construction algorithm are ordered. Therefore, if a firewall f designed by a team is a non-ordered FDD f, a sequence of rules that consists of all the rules in $S_f$, where $S_f$ is the set of all the rules defined by the decision paths of f, is first generated; second, an equivalent ordered FDD f' is constructed from the sequence of rules. Then, f', instead of f, is compared with other firewalls for discrepancies, if any.

Informally, two FDDs are semi-isomorphic if their graphs are isomorphic, the labels of their corresponding nonterminal nodes match, and the labels of their corresponding edges match. In other words, only the labels of their terminal nodes may differ. Formally, two FDDs f and f' are defined to be semi-isomorphic if and only if there exists a one-to-one mapping σ from the nodes of f onto the nodes of f', such that the following two conditions hold:
1. For any node v in f, either both v and σ(v) are nonterminal nodes with the same label, or both of them are terminal nodes;
2. For each edge e in f, where e is from a node $v_1$ to a node $v_2$, there is an edge e' from σ($v_1$) to σ ($v_2$) in f', and the two edges e and e' have the same label.

The algorithm for transforming two ordered FDDs to two semi-isomorphic FDDs uses the following three basic operations. (Note that none of these operations changes the semantics of the FDDs.)
1. Node Insertion: If along all the decision paths containing a node v, there is no node that is labeled with a field F, a node v' labeled F can be inserted right above v as follows: make all incoming edges of v point to v', create one edge from v' to v, and label this edge with the domain of F.
2. Edge Splitting: For an edge e from $v_1$ to $v_2$, if $I(e) = S_1 \cup S_2$, where neither $S_1$ nor $S_2$ is empty, then e can be split into two edges as follows: replace e by two edges from $v_1$ to $v_2$, label one edge with $S_1$ and label the other with $S_2$.
3. Subgraph Replication: If a node v has m (m≧2) incoming edges, m copies of the subgraph rooted at v can be made, and make each incoming edge of v point to the root of one distinct copy.

FDD Simplification

Before applying the shaping algorithm, presented below, to two ordered FDDs, each is preferably transformed to an equivalent simple FDD, where an FDD is simple if and only if each node in the FDD has at most one incoming edge and each edge in the FDD is labeled with a single interval.

It is straightforward that the two operations of edge splitting and subgraph replication can be applied repetitively to an FDD in order to make this FDD simple. Note that the graph of a simple FDD is an outgoing directed tree. In other words, each node in a simple FDD, except the root, has only one parent node, and has only one incoming edge (from the parent node).

Node Shaping

Next, the procedure for transforming two shapeable nodes to two semi-isomorphic nodes is introduced, which is the basic building block in the shaping algorithm for transforming two ordered FDDs to two semi-isomorphic FDDs. Shapeable nodes and semi-isomorphic nodes are defined as follows.

Definition (Shapeable Nodes) Let $f_a$ and $f_b$ be two ordered simple FDDs, $v_a$ be a node in $f_a$ and $v_b$ be a node in $f_b$. Nodes $v_a$ and $v_b$ are shapeable if and only if one of the following two conditions holds:
1. Both $v_a$ and $v_b$ have no parents, i.e., they are the roots of their respective FDDs;
2. Both $v_a$ and $v_b$ have parents, their parents have the same label, and their incoming edges have the same label.

For example, referring to FIG. 6, two nodes $F_1$ 602-604 in FIG. 6 are shapeable since they have no parents.

Definition (Semi-isomorphic Nodes): Let $f_a$ and $f_b$ be two ordered simple FDDs, $v_a$ be a node in $f_a$ and $v_b$ be a node in $f_b$. The two nodes $v_a$ and $v_b$ are semi-isomorphic if and only if one of the following two conditions holds:
1. Both $v_a$ and $v_b$ are terminal nodes;
2. Both $v_a$ and $v_b$ are nonterminal nodes with the same label and there exists a one-to-one mapping σ from the children of $v_a$ to the children of $v_b$ such that for each child v of $v_a$, v and σ(v) are shapeable.

Given two shapeable nodes $v_a$ and $v_b$, whose parents have the same label, the process for making two shapeable nodes $v_a$ and $v_b$ semi-isomorphic includes the following two steps:

1. This step is skipped if $v_a$ and $v_b$ have the same label, or both of them are terminal nodes. Otherwise, without loss of generality, assume $F(v_a)<F(v_b)$. In all the decision paths containing node $v_b$, no node is labeled $F(v_a)$ because the parent of $v_a$ and the parent of $v_b$ have the same label. Therefore, a new node $v'_b$ with label $F(v_a)$ can be created, a new edge with label $D(F(v_a))$ from $v'_b$ to $v_b$ can be created, and all incoming edges of $v_b$ are made to point to $v'_b$. Now $v_a$ has the same label as $v'_b$. (Recall that this node insertion operation leaves the semantics of the FDD unchanged.)
2. From the previous step, $v_a$ and $v_b$ are assumed to have the same label. In the current step, the two operations of edge splitting and subgraph replication are utilized to build a one-to-one correspondence from the children of $v_a$ to the children of $v_b$ such that each child of $v_a$ and its corresponding child of $v_b$ are shapeable.

Suppose $D(F(v_a))=D(F(v_b))=[a, b]$. Note that each outgoing edge of $v_a$ or $v_b$ is labeled with a single interval because the two FDDs are simple FDDs. Suppose $v_a$ has m outgoing edges $\{e_1, \ldots, e_m\}$, where $I(e_i)=[a_i, b_i]$, $a_1=a$, $b_m=b$, and every $a_{i+1}=b_i+1$. Also suppose $v_b$ has n outgoing edges $\{e'_1, \ldots, e'_n\}$, where $I(e'_i)=[a'_i, b'_i]$, $a'_1=a$, $b'_n=b$, and every $a'_{i+1}=b'_i+1$.

Comparing edge $e_1$, whose label is $[a, b_1]$, and $e'_1$, whose label is $[a, b'_1]$, there are only the following two cases:
(1) $b_1=b'_1$: In this case $I(e_i)=I(e'_i)$, therefore, node $e_1$.t and node $e'_1$.t are shapeable. (Recall that e.t is utilized to denote the node to which edge e points.) Then, $e_2$ and $e'_2$ are compared since both $I(e_2)$ and $I(e'_2)$ begin with $b_1+1$.
(2) $b_1 \neq b'_1$: Without loss of generality, assume $b_1<b'_1$. In this case, split $e'_i$ into two edges e and e', where e is labeled $[a, b_1]$ and e' is labeled $[b_1+1, b'_1]$. Then, make two copies of the subgraph rooted at $e'_1$.t and let e and e' point to one copy each. Thus $I(e_1)=I(e)$ and the two nodes, $e_1$.t and e.t are shapeable. Then, continue to compare the two edges $e_2$ and e' since both $I(e_2)$ and $I(e')$ begin with $b_1+1$.

The above process continues until the last outgoing edge of $v_a$ and the last outgoing edge of $v_b$ are reached. Note that each time a comparison is made between an outgoing edge of $v_a$ and an outgoing edge of $v_b$, the two intervals labeled on the two edges begin with the same value. Therefore, the last two edges that we compare must have the same label because they both ends with b. In other words, this edge splitting and subgraph replication process will terminate. When it terminates, $v_a$ and $v_b$ become semi-isomorphic.

In the following pseudocode for making two shapeable nodes in two ordered simple FDDs semi-isomorphic, we use $I(e)<I(e')$ to indicate that every integer in $I(e)$ is less than every integer in $I(e')$.

---

Procedure Node__Shaping($f_a$, $f_b$, $v_a$, $v_b$)

Input: Two ordered simple FDDs $f_a$ and $f_b$, and two shapeable nodes $v_a$ in $f_a$ and $v_b$ in $f_b$
Output: The two nodes $v_a$ and $v_b$ become semi-isomorphic, and the procedure returns a set S of node pairs of the form($w_a$, $w_b$) where $w_a$ is a child of $v_a$ in $f_a$, $w_b$ is a child of $v_b$ in $f_b$, and the two nodes $w_a$ and $w_b$ are shapeable.
Steps:
1. if both $v_a$ and $v_b$ are terminal, then return(∅);
   else if the condition that both $v_a$ and $v_b$ are nonterminal and they have the same label does not hold {
     /*Here either both $v_a$ and $v_b$ are nonterminal and they have different labels, or one node is terminal and the other is nonterminal. Without loss of generality, assume one the following conditions holds:
       (1) both $v_a$ and $v_b$ are nonterminal and $F(v_a) < F(v_b)$,
       (2) $v_a$ is a nonterminal node and $v_b$ is a terminal node.*/
     insert a new mode with label $F(v_a)$
     above $v_b$, and call the new node $v_b$;}

-continued

Procedure Node_Shaping($f_a$, $f_b$, $v_a$, $v_b$)

2. let $E(v_a)$ be $\{e_{a,1},...,e_{a,m}\}$ where $I(e_{a,1}) < ... < I(e_{a,m})$.
   let $E(v_b)$ be $\{e_{b,1},...,e_{b,n}\}$ where $I(e_{b,1}) < ... < I(e_{b,n})$.
3. i :=1; j :=1;
   while ( (i<m) or (j<n) ) do{
   /*During this loop, the two intervals $I(e_{a,i})$ and $I(e_{b,j})$ always begin with the same integer.*/
   let $I(e_{a,i})$ = [A,B] and $I(e_{b,j})$ = [A,C], where A, B, C are three integers;
   if B = C then {i := i + 1; j := j + 1;}
   else if B<C then{
       (a) create an outgoing edge e of $v_b$, and label e with [A,B];
       (b) make a copy of the subgraph rooted at $e_{b,j}$.t and make e point to the root of the copy;
       (c) $I(e_{b,j})$ := [B+1,C];
       (d) i := i + 1;}
   else {/*B > C*/
       (a) create an outgoing edge e of $v_a$, and label e with [A,C];
       (b) make a copy of the subgraph rooted at $e_{a,j}$.t and make e point to the root of the copy;
       (c) $I(e_{a,j})$ := [C+1,B];
       (d) j := j + 1;}
4. /* Now $v_a$ and $v_b$ become semi-isomorphic.*/
   let $E(v_a)$ = { $e_{a,1}$, ..., $e_{a,k}$ } where $I(e_{a,1}) < ... < I(e_{a,k})$ and k ≧ 1;
   let $E(v_b)$ = { $e_{b,1}$, ..., $e_{b,k}$ } where $I(e_{b,1}) < ... < I(e_{b,k})$ and k ≧ 1;
   S := Ø
   for i = 1 to k do
       add the pair of shapeable nodes ($e_{a,j}$.t, $e_{b,j}$.t) to S;
   return(S);
End If the above node shaping procedure is applied to the two shapeable nodes $F_1$ 602-604 in FIG. 6, the resulting two semi-isomorphic nodes are shown in FIG. 7.

FDD Shaping

To make two ordered FDDs $f_a$ and $f_b$ semi-isomorphic, first $f_a$ and $f_b$ are simplified, then $f_a$ and $f_b$ are made semi-isomorphic as follows. Suppose a queue Q is initially empty. At first the pair of shapeable nodes consisting of the root of $f_a$ and the root of $f_b$ are placed into Q. As long as Q is not empty, the head of Q is removed, and the two shapeable nodes are fed to the above Node Shaping procedure. Then all the pairs of shapeable nodes returned by the Node Shaping procedure are placed into Q. When the algorithm finishes, $f_a$ and $f_b$ become semi-isomorphic. The pseudocode for this shaping algorithm is as follows:

Shaping Algorithm

Input: Two ordered FDDs $f_a$ and $f_b$
Output: $f_a$ and $f_b$ are semi-isomorphic
Steps:
1. make the two FDDs $f_a$ and $f_b$ simple;
2. Q := Ø
3. add the shapeable pair (root of $f_a$, root of $f_b$) to Q;
4. while Q ≠ Ø do {
       remove the header pair ($v_a$, $v_b$) from Q;
       S := Node_Shaping ($f_a$, $f_b$, $v_a$, $v_b$);
       add every shapeable pair from S into Q;
   }
End As an example, applying the above shaping algorithm to the two FDDs in FIGS. 2 and 6, two semi-isomorphic FDDs are obtained. One of those FDDs is shown in FIG. 8, and the other is identical to that of in FIG. 8 with one exception, namely the "a" or "d" labels of the black terminal nodes are reversed.

Comparison Algorithm

The comparison algorithm is utilized to compare two semi-isomorphic FDDs. Given two semi-isomorphic FDDs f and f' with a one-to-one mapping σ, each decision path ($v_1 e_1 \ldots v_k e_k v_{k+1}$) in f has a corresponding decision path ($\sigma(v_1) \sigma(e_1) \ldots \sigma(v_k)\sigma(e_k)\sigma(v_{k+1})$) in f'. Similarly, each rule $(F(v_1) \in I(e_1)) \wedge \ldots \wedge (F(v_k) \in I(e_k)) \rightarrow F(v_{k+1})$ in $S_f$ has a corresponding rule $(F(\sigma(v_1)) \in I(\sigma(e_1))) \wedge \ldots \wedge (F(\sigma(v_k)) \in I(\sigma(e_k))) \rightarrow F(\sigma(v_{k+1}))$ in $S_{f'}$. Note that $F(v_i)=F(\sigma(v_i))$ and $I(e_i)=I(\sigma(e_i))$ for each i where $1 \leq i \leq k$. Therefore, for each rule $(F(v_1) \in I(e_1)) \wedge \ldots \wedge (F(v_k) \in I(e_k)) \rightarrow F(v_{k+1})$ in $S_f$, the corresponding rule in $S_{f'}$ is $(F(v_1) \in I(e_1)) \wedge \ldots \wedge (F(v_k) \in I(e_k)) \rightarrow F(\sigma(v_{k+1}))$. Each of these two rules is called the companion of the other. This companionship implies a one-to-one mapping from the rules defined by the decision paths in f to the rules defined by the decision paths in f'. Note that for each rule and its companion, either they are identical, or they have the same predicate but different decisions. Therefore, $S_f-S_{f'}$ is the set of all the rules in $S_f$ that have different decisions from their companions. Similarly for $S_{f'}-S_f$. Note that the set of all the companions of the rules in $S_f-S_{f'}$ is $S_{f'}-S_f$, and similarly the set of all the companions of the rules in $S_{f'}-S_f$ is $S_f-S_{f'}$. Since these two sets manifest the discrepancies between the two FDDs, the two design teams can investigate them to resolve the discrepancies.

Figure 4:
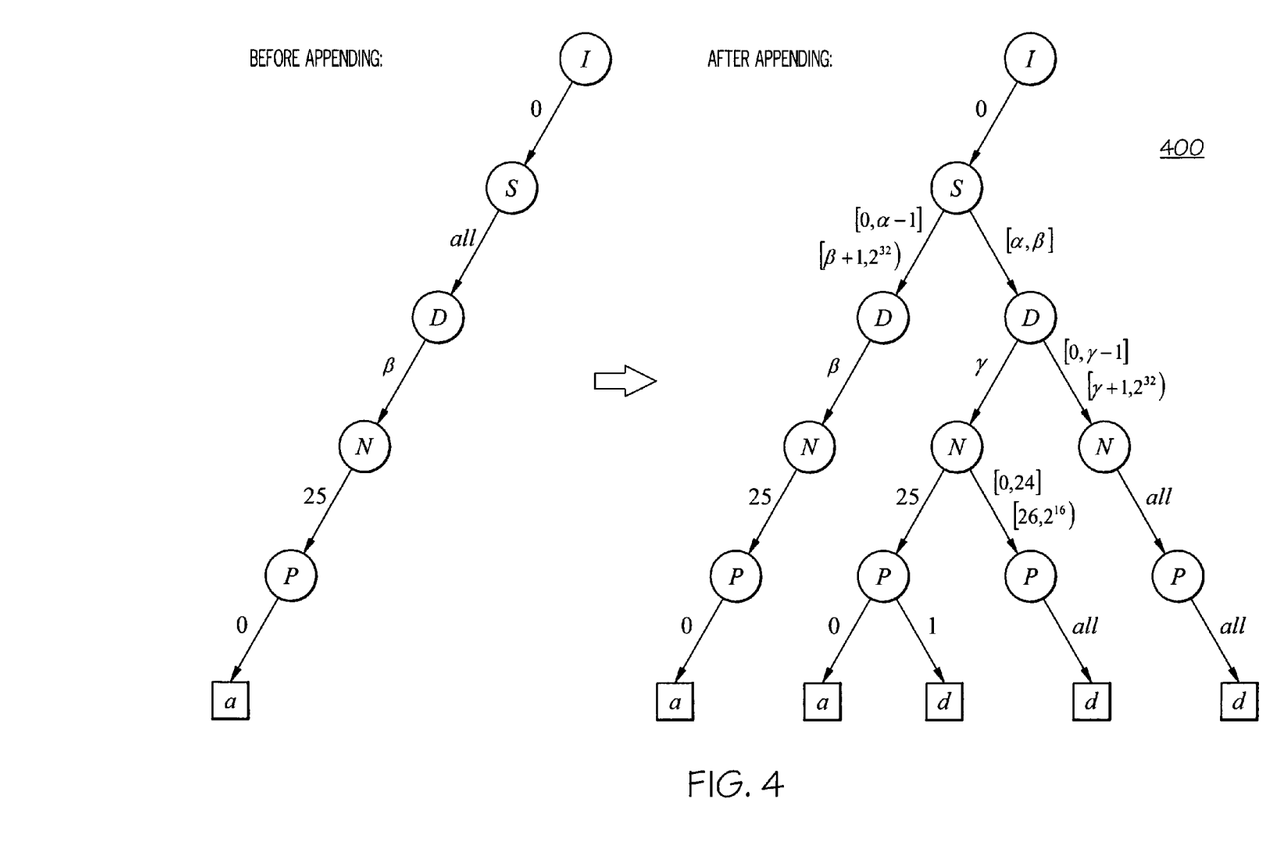
FIG. 4 is a tree diagram illustrating an exemplary method of appending a rule to a partial firewall according to a preferred embodiment of the present invention.
Figure 9A:
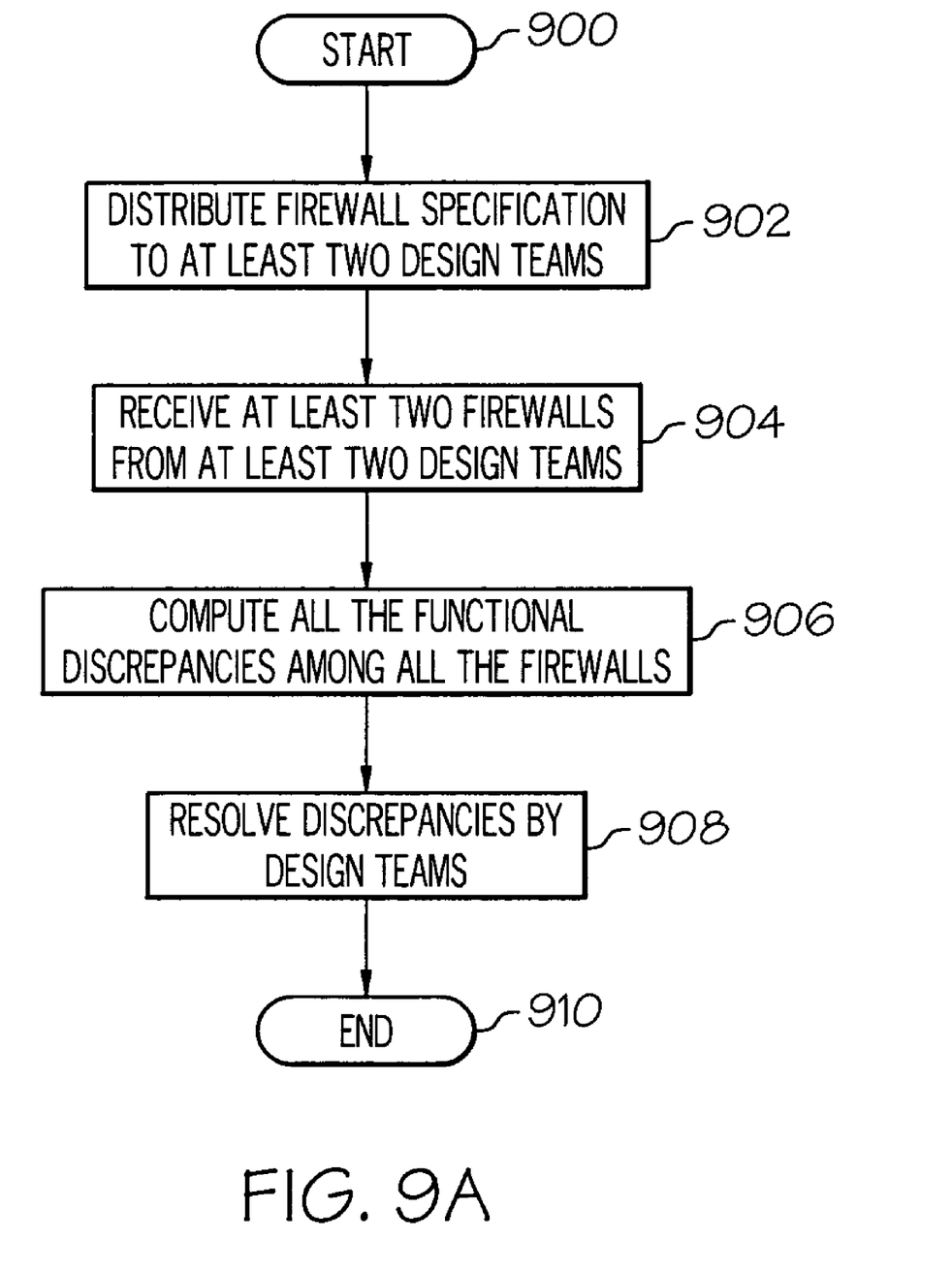
FIG. 9A is a high-level logical flowchart diagram depicting an exemplary method of diverse firewall design according to a preferred embodiment of the present invention.

Let f be FDD 900 in FIG. 9, and let f' be a FDD that is identical to f with one exception, namely the labels of the black terminal nodes are reversed. Here f is equivalent to the firewall in FIG. 3 designed by Team A, and f' is equivalent to the firewall in FIG. 4 designed by Team B. By comparing f and f' the following discrepancies between the two firewalls designed by Team A and Team B are discovered:

1. $(I \in \{0\}) \wedge (S \in [\alpha,\beta]) \wedge (D \in \{\gamma\}) \wedge (N \in \{25\}) \wedge (P \in \{0\}) \rightarrow d$ in $f_a$/a in $f_b$ Question to investigate: Should computers from the malicious domain send email to the mail server? Team A indicates "no", while Team B "indicates "yes".

2. $(I \in \{0\}) \wedge (S \in [0,\alpha-1] \cup [\beta+1, 2^{32}]) \wedge (D \in \{\gamma\}) \wedge (N \in \{25\}) \wedge (P \in \{1\}) \wedge \rightarrow d$ in $f_a$/a in $f_b$ Question to investigate: Should UDP packets sent from the hosts who are not in the malicious domain be allowed to the mail server? Team A indicates "no", while Team B indicates "yes".

3. $(I \in \{0\}) \wedge (S \in [0,\alpha-1] \cup [\beta+1, 2^{32})) \wedge (D \in \{\gamma\}) \wedge (N \in [0,24] \cup [26, 2^{16}) ) \wedge (P \in \text{all}) \wedge \to d$ in $f_a/a$ in $f_b$ Question to investigate: Should we allow the packets with a port number other than 25 be sent from the hosts who are not in the malicious domain to the mail server? Team A says no, while Team B says yes.

FIG. 9A is a high-level logical flowchart diagram illustrating an exemplary method for implementing diverse firewall design according to a preferred embodiment of the present invention. The process begins at step 900 and proceeds to step 902, which depicts the distribution of a firewall specification to at least two design teams. The process continues to step 904, which illustrates firewall design manager 160 receiving at least two firewall designs from the at least two design teams. The process continues to step 906, which depicts firewall design manager 160 computing functional discrepancies between the at least two firewall designs (discussed herein in more detail in conjunction with FIG. 9B). The process proceeds to step 908, which illustrates firewall design manager 160 resolving discrepancies between multiple firewall designs. The process ends, as depicted in step 910.

Figure 9B:
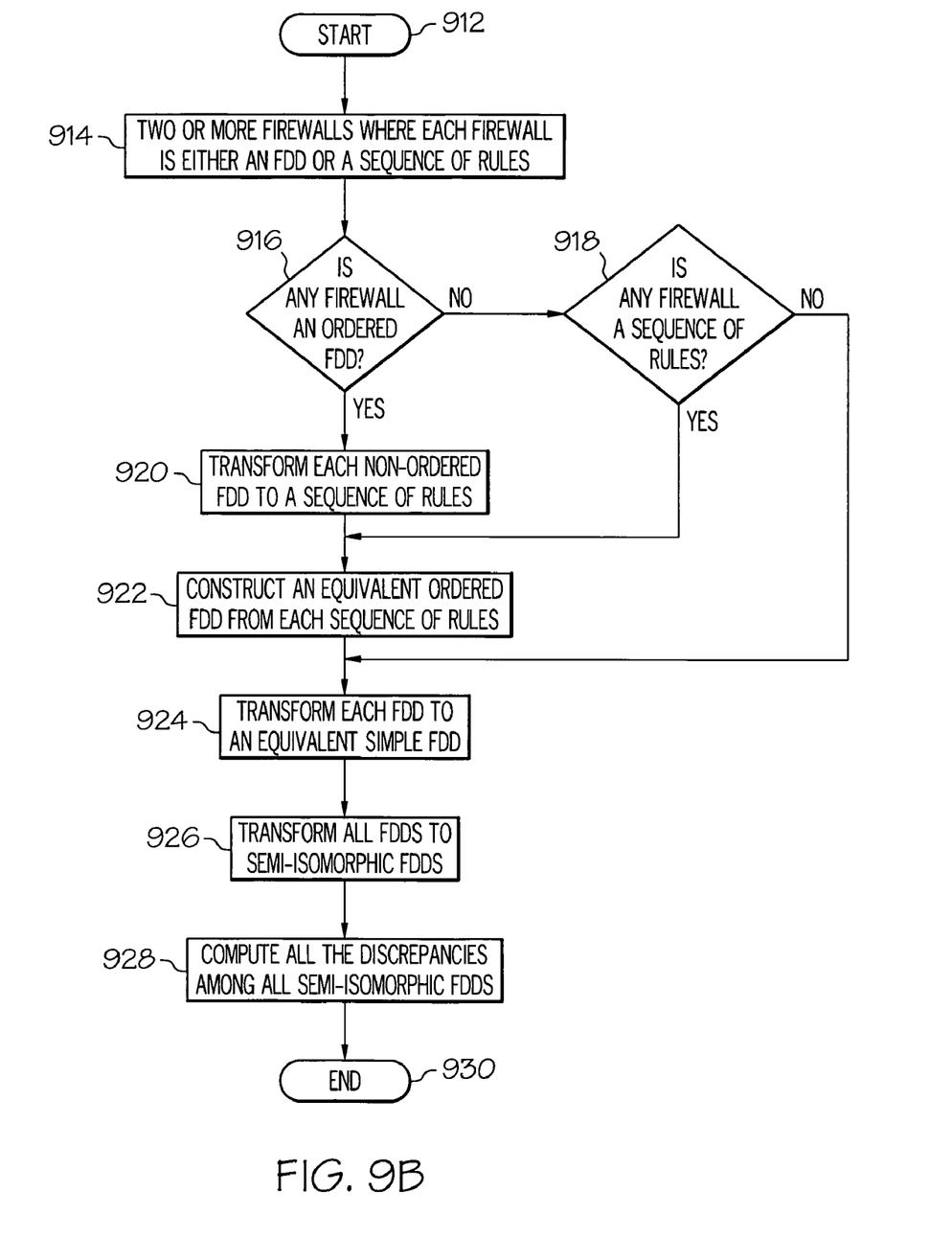
FIG. 9B is a more detailed high-level logical flowchart diagram illustrating an exemplary method of comparing functional discrepancies among at least two firewall designs according to a preferred embodiment of the present invention.

FIG. 9B is a high-level logical flowchart diagram depicting an exemplary method for computing functional discrepancies between at least two firewall designs according to a preferred embodiment of the present invention. The process begins at step 912 and proceeds to step 914, which illustrates firewall design manager 160 receiving at least two firewall designs from firewall design teams. The received firewalls are expressed as either a firewall decision diagram or a sequence of rules.

The process continues to step 916, which illustrates firewall design manager 160 determining if any of the received firewall designs is expressed as a non-ordered firewall decision diagrams. If any of the received firewall designs is expressed as a non-ordered firewall decision diagrams, the process continues to step 920, which illustrates firewall design manager 160 transforming each non-ordered firewall decision diagram into a sequence of rules.

The process continues to step 922, which illustrates firewall design manager 160 constructing an equivalent ordered firewall decision diagram from each sequence of rules. Firewall design manger 160 transforms each firewall decision diagram to an equivalent simple firewall decision diagram (step 924). The process proceeds to step 926, which depicts firewall design manager 160 transforming all firewall decision diagrams to semi-isomorphic firewall decision diagrams. The process continues to step 928, which illustrates firewall design manager 160 computing discrepancies between the semi-isomorphic firewall decision diagrams. The process then ends, as illustrated in step 930.

Returning to step 916, if firewall design manager 160 determines that no firewall design is expressed as a non-ordered firewall decision diagram, the process continues to step 918, which illustrates firewall design manager 160 determining if at least one firewall design is expressed as a sequence of rules. If at least one firewall design is expressed as a sequence of rules, the process continues to step 922 and proceeds in an iterative fashion. If no firewall design is expressed as a sequence of rules, the process continues to step 924 and proceeds in an iterative fashion.

Those with skill in this art will appreciate that the present invention may be applied to many systems where a system can be represented by a sequence of rules. Examples of such systems are rule-based systems in the area of artificial intelligence and access control in the area of databases.

As discussed, the present invention includes a system, computer-implementable method, and computer-usable medium for resolving discrepancies between diverse firewall designs. In a preferred embodiment of the present invention, a firewall design manager receives at least two designs for a rule-based system and computing at least one functional discrepancy between the at least two designs utilizing decision diagrams.

It should be understood that at least some aspects of the present invention may alternatively be implemented in a computer-usable medium that contains a program product. Programs defining functions in the present invention can be delivered to a data storage system or a computer system via a variety of non-writable storage media (e.g., CD-ROM) and, writable storage media (e.g., hard disk drive, read/write CD-ROM, optical media).

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system include, but not limited to, personal computers, servers, workstations, network computers, main frame computers, routers, switches, Personal Digital Assistants (PDAs), telephones, and any other system capable of processing, transmitting, receiving, capturing, and/or storing data.

What is claimed is:

1. A method for detecting functional discrepancies between two sequences of firewall rules, said method comprising:
   receiving a first and second sequences of firewall rules within a computer system;
   converting said first sequence of firewall rules to a first firewall decision diagram (FDD);
   converting said second sequence of firewall rules to a second FDD;
   transforming said first and second FDDs to first and second transformed FDDs, respectively, wherein said first and second transformed FDDs are semi-isomorphic; and
   comparing said first and second transformed FDDs to determine at least one functional discrepancy between said first and second sequences of firewall rules.

2. The method of claim 1, wherein said converting said first sequence of firewall rules further includes:
   utilizing a first rule from said first sequence of firewall rules to generate a first partial FDD that is equivalent to said first rule;
   incorporating a second rule from said first sequence of firewall rules into said first partial FDD such that said first partial FDD is equivalent to said first and second rules; and
   incorporating remaining rules from said first sequence of firewall rules into said first partial FDD such that said first partial FDD is equivalent to all rules within said first sequence of firewall rules.

3. The method of claim 1, wherein said converting said second sequence of firewall rules further includes:
   utilizing a first rule from said second sequence of firewall rules to generate a second partial FDD that is equivalent to said first rule;
   incorporating a second rule from said second sequence of firewall rules into said second partial FDD such that said second partial FDD is equivalent to said first and second rules; and
   incorporating remaining rules from said second sequence of firewall rules into said second partial FDD such that said second partial FDD is equivalent to all rules within said second firewall design.

4. The method of claim 1, wherein said first transformed FDD is equivalent to said first FDD.

5. The method of claim 1, wherein said second transformed FDD is equivalent to said second FDD.

6. The method of claim 1, wherein said first and second FDDs are non-isomorphic FDDs.

7. A system comprising:
a processor;
a databus coupled to said processor;
means for receiving a first and second sequences of firewall rules within said system;
means for converting said first sequence of firewall rules to a first firewall decision diagram (FDD);
means for converting said second sequence of firewall rules to a second FDD;
means for transforming said first and second FDDs to first and second transformed FDDs, respectively, wherein said first and second transformed FDDs are semi-isomorphic; and
means for comparing said first and second transformed FDDs to determine at least one functional discrepancy between said first and second sequences of firewall rules.

8. The system of claim 7, wherein said means for converting said first sequence of firewall rules further includes:
means for utilizing a first rule from said first sequence of firewall rules to generate a first partial FDD that is equivalent to said first rule;
means for incorporating a second rule from said first sequence of firewall rules into said first partial FDD such that said first partial FDD is equivalent to said first and second rules; and
means for incorporating remaining rules from said first sequence of firewall rules into said first partial FDD such that said first partial FDD is equivalent to all rules within said first sequence of firewall rules.

9. The system of claim 7, wherein said means for converting said second sequence of rules further includes:
means for utilizing a first rule from said second sequence of firewall rules to generate a second partial FDD that is equivalent to said first rule;
means for incorporating a second rule from said second sequence of firewall rules into said second partial FDD such that said second partial FDD is equivalent to said first and second rules; and
means for incorporating remaining rules from said second sequence of firewall rules into said second partial FDD such that said second partial FDD is equivalent to all rules within said second firewall design.

10. The system of claim 7, wherein said first transformed FDD is equivalent to said first FDD.

11. The system of claim 7, wherein said second transformed FDD is equivalent to said second FDD.

12. The system of claim 7, wherein said first and second FDDs are non-isomorphic FDDs.

13. A non-transitory computer-usable medium embodying computer program code for detecting functional discrepancies between two sequences of firewall rules, said non-transitory computer-usable medium comprising:
program code for receiving a first and second sequences of firewall rules within a computer system;
program code for converting said first sequence of firewall rules to a first firewall decision diagram (FDD);
program code for converting said second sequence of firewall rules to a second FDD;
program code for transforming said first and second FDDs to first and second transformed FDDs, respectively, wherein said first and second transformed FDDs are semi-isomorphic; and
program code for comparing said first and second transformed FDDs to determine at least one functional discrepancy between said first and second sequences of firewall rules.

14. The non-transitory computer-usable medium of claim 13, wherein said program code for converting said first sequence of firewall rules further includes:
program code for utilizing a first rule from said first sequence of firewall rules to generate a first partial FDD that is equivalent to said first rule;
program code for incorporating a second rule from said first sequence of firewall rules into said first partial FDD such that said first partial FDD is equivalent to said first and second rules; and
program code for incorporating remaining rules from said first sequence of firewall rules into said first partial FDD such that said first partial FDD is equivalent to all rules within said first sequence of firewall rules.

15. The non-transitory computer-usable medium of claim 13, wherein said program code for converting said second sequence of firewall rules further includes:
program code for utilizing a first rule from said second sequence of firewall rules to generate a second partial FDD that is equivalent to said first rule;
program code for incorporating a second rule from said second sequence of firewall rules into said second partial FDD such that said second partial FDD is equivalent to said first and second rules; and
program code for incorporating remaining rules from said second sequence of firewall rules into said second partial FDD such that said second partial FDD is equivalent to all rules within said second firewall design.

16. The non-transitory computer-usable medium of claim 13, wherein said first transformed FDD is equivalent to said first FDD.

17. The non-transitory computer-usable medium of claim 13, wherein said second transformed FDD is equivalent to said second FDD.

18. The non-transitory computer-usable medium of claim 12, wherein said first and second FDDs are non-isomorphic FDDs.

* * * * *